Jan. 20, 1970 H. W. GRIKSCHEIT 3,490,577
CONCRETE CYLINDER MOLD AND METHOD OF CONDITIONING SAME
Filed May 12, 1967

INVENTOR.
HENRY W. GRIKSCHEIT.
BY
WILSON, SETTLE, BATCHELDER &
CRAIG.
ATT'YS.

United States Patent Office 3,490,577
Patented Jan. 20, 1970

3,490,577
CONCRETE CYLINDER MOLD AND METHOD OF CONDITIONING SAME
Henry W. Grikscheit, 3230 Devonbrook Drive, Bloomfield Hills, Mich. 48013
Filed May 12, 1967, Ser. No. 638,084
Int. Cl. B28b 7/34; B29c 1/02; B65d 85/00
U.S. Cl. 206—46                                                7 Claims

ABSTRACT OF THE DISCLOSURE

A concrete cylinder mold is utilized to condition concrete for compression tests and includes a cylinder and cap with porous open cell urethane foam moisture retaining material on the inner walls thereof and such material is hardened on the cylinder outer walls and the inner walls are used to retain a mixture of lime and water to provide wet walls before concrete is placed in the cylinder to condition the concrete without the use of the so called "wet rooms." The same plastic material urethane may be used to provide a container of like formation for the storage or shipping of certain articles with the walls being dry or wet walls which require the maintenance of such walls for the preservation of said articles. The disclosure also includes the method of conditioning concrete cylinder molds for compression tests. The concrete molds are formed of the rigid foam material and the container is produced of the flexible foam material with a hardened outer surface.

FIELD OF THE INVENTION

The field of the invention is concrete cylinder molds with walls suitable for retaining moisture and the method of conditioning same for compression tests and containers which may include walls suitable for retaining moisture for the storing and shipping of various articles.

It has been previously proposed to provide concrete molds to condition concrete for compression tests by pouring the concrete into a mold and later removing it from its mold to place the concrete in a "wet room" with 100% relative humidity for a period of time and then apply a hardened cap on each end to prepare the mold for the compression test.

SUMMARY OF THE INVENTION

In accordance with my invention I provide a concrete cylinder mold by forming a cylinder with a closed end and a cap for closing the opposite end by utilizing a plastic material such as porous open cell rigid urethane foam to form moisture retaining inner walls of the cylinder and cap and apply known treatment to the exterior walls thereof to render the exterior walls impervious to moisture. The interior of the cylinder is provided with a mixture of lime and water to permit the interior walls to receive such mixture to a desired amount and remove the surplus before the concrete enters the cylinder. With concrete in the cylinder its cap is used to close the open end and the concrete is thus later conditioned for testing by simply removing the cylinder wall between the closed end of the cylinder and the cap which cap and end wall are used in performing the test. The disclosure also includes a like shaped container produced of porous open cell flexible urethane foam to provide inner walls capable of retaining moisture and exterior walls impervious to moisture to thus provide a container with wet or dry walls for storing or shipping articles therein which require the maintenance of such walls for retaining certain qualities of said articles.

It is an object of my invention to obviate the use of the "wet room" and the capping of the concrete in the conditioning of concrete for compression tests.

More specifically it is an object of my invention to provide a cylindrical mold with a closed end and cap formed of interior moisture retaining walls with exterior walls which are impervious to moisture and add a mixture of lime and water to the inner walls to condition the concrete for a compression test in said mold and later removing the side wall of the mold while retaining the end walls and cap for use during the test to thereby obviate the use of a "wet room" and capping.

It is also an object of my invention to provide a container formed of plastic material such as porous open cell flexible foam capable of retaining moisture and with toughened exterior walls impervious to moisture for storing and/or shipping with either dry or wet interior walls to preserve the articles therein.

Other objects of this invention will appear in the following description and appended claims, reference being had to the accompanying drawings forming a part of this specification wherein like reference characters designate corresponding parts in the several views.

Figure 1:
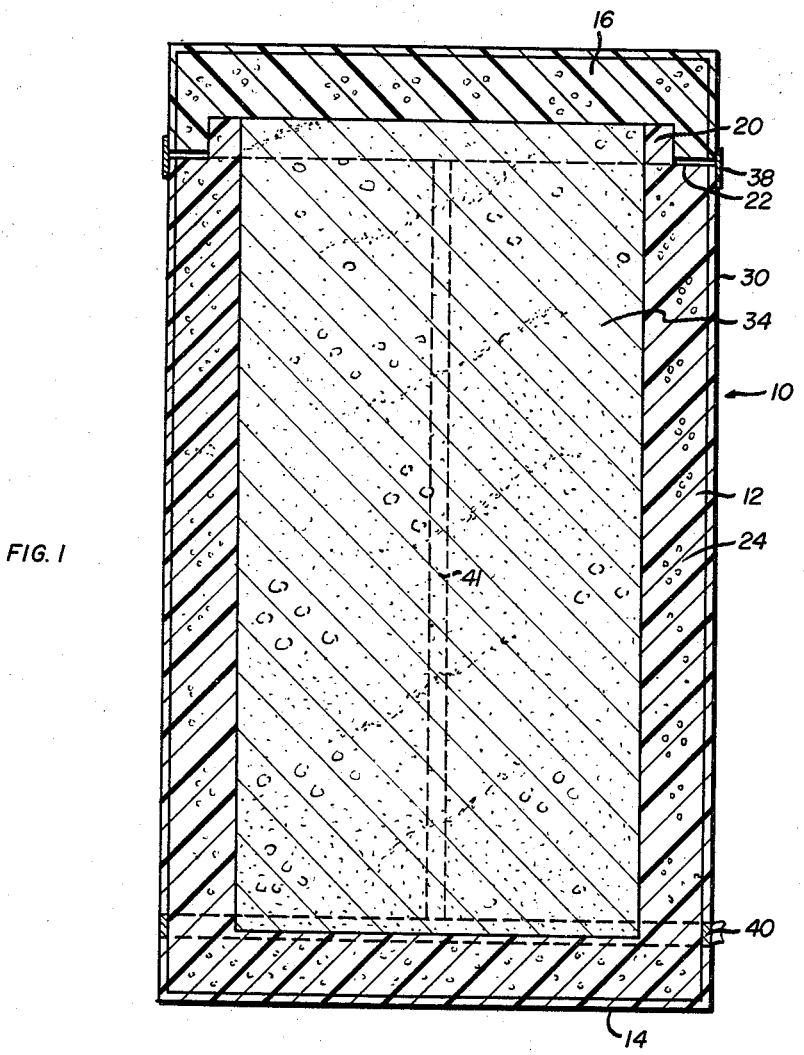
FIGURE 1 is a side view in cross section of the concrete cylinder mold embodying features of my invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a concrete cylinder mold in the form of a container. The container includes a cylinder wall 12 closed on one end 14 and closed on the opposite end by a cap 16. The cylinder wall 12 is provided with a reduced portion 20 which provides a flange 22 to receive and support the cap 16. The container including its cap is molded from material such as porous open cell rigid urethane foam 24 leaving the interior walls suitable for absorbing moisture. The outer walls are appropriately treated during the molding operation to provide a toughened coat 30 which is impervious to moisture. A quantity of a mixture of lime and water is placed into the interior of the cylinder where the interior walls absorb this liquid to the desired amount for example, equal to 100% relative humidity and the surplus liquid in the cylinder is then evacuated. The concrete 34 is then poured into the interior of the cylinder and the upper end screed off and the cap 16 placed in position to adhere to the concrete. A strip of adhesive tape 38 is wrapped around the container 10 at the joint between the cap 16 and wall 12 to seal the joint.

When the above takes place the filled cylinder content is being conditioned for the crush or compression test. It is the practice to use four or more containers at the same time with settings of 7, 14, 28 days or another for a 28 day before testing the concrete. Any suitable compression test equipment may be used for conducting the test.

In molding the cylinder a peel off score band 40 is molded in the cylinder adjacent the end 14 and a like vertical score band 41 may be used molded in the vertical side wall. The band 40 may be made of elastic fiber glass and may be peeled off to disengage the outer coating 30 from the end 14 and the tape 38 removed and the vertical band 41 may be peeled off to sever the side wall 12 from end to end. At this time the remainder of the cylinder wall may be cracked or otherwise removed from the concrete. The container 10 shown in FIGURE 1 is in completed form with the concrete therein. The cylinder may be of any desired shape such as cylindrical or square.

With the cylinder wall 12 removed the end 14 and cap 16 may be used to apply pressure thereon during the compression test.

Thus the foregoing arrangement obviates the so called "wet room" and necessity of capping the ends of the concrete before the compression test.

The mold shown in FIGURE 1 and described herein is for conditioning concrete and it may be used for conditioning other like compacted materials and is not limited to concrete in the ordinary sense.

Figures 2, 3:
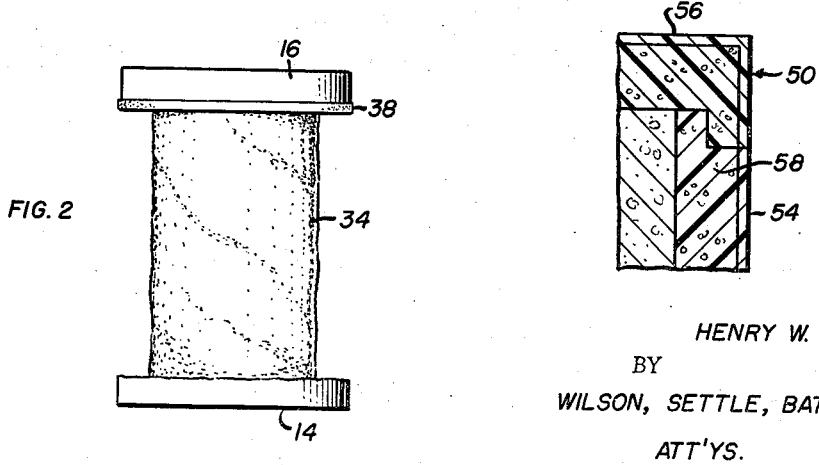
FIGURE 2 is a view in elevation of the side of the cylinder with the vertical wall thereof removed.
FIG. 3 is a fragmentary view in cross section of a container formed of modified material than the mold shown in FIGURES 1 and 2.

The container shown in FIGURE 3 is designated in general by the numeral 50 and includes a vertical portion 54 closed on the end thereof by a cap 56 while the opposite end is closed as in the mold shown in FIGURE 1. In this embodiment the interior walls are capable of retaining moisture and the exterior walls are impervious to moisture with the walls being formed by plastic material such as porous open cell flexible urethane 58. This container may have a readily removable cap and be used to store or ship articles in either dry or wet walls as required to preserve the articles. The container 50 may be the same as the mold 10 embodying the use of urethane plastic but formed of flexible plastic urethane instead of rigid plastic urethane as used in mold 10.

While exemplary embodiments of the invention have been described in detail, it will be apparent to those skilled in the art that the disclosed embodiments may be modified. Therefore, the foregoing description is to be considered exemplary rather than limiting.

What is claimed is:

1. In a concrete cylinder mold for conditioning concrete for compression tests and including a cylinder having a continuation at one end defining a first end cap and a second end cap received on and closing the opposite end of said cylinder and enclosing concrete within said cylinder, the improvement of said cylinder and end caps having walls consisting of a moisture retaining porous material defining the interior of said mold said moisture retaining portions being impregnated with a liquid for conditioning said concrete, said walls of said cylinder and end caps having an impervious outer surface defining the exterior of said mold, and means incorporated in said cylinder wall accommodating removal of said cylinder from said end caps whereby concrete in said mold may be retained between said end caps and said cylinder may be removed for conducting tests.

2. The invention as defined in claim 1 wherein the walls of said container are formed of porous open cell urethane rigid foam absorbent material on the inner surfaces and toughened to be impervious to moisture on the outer surfaces.

3. A concrete cylinder mold as defined in claim 1, wherein the liquid comprises a mixture of lime and water.

4. The method of conditioning concrete for compression tests wherein the improvement comprises utilizing a concrete mold having moisture retaining interior walls forming a cylinder closed at one end with exterior surfaces impervious to moisture, introducing a quantity of a mixture of lime and water into said cylinder for said interior walls, removing the surplus mixture not retained in said interior walls, introducing concrete into said cylinder and capping the open end of the cylinder with a cap of moisture retaining interior surfaces and exterior surfaces impervious to moisture to condition the concrete with moisture and later removing the cylindrical wall of the cylinder and retaining the closed end of the cylinder and said cap on the concrete to be used in the compression test.

5. The invention as defined in claim 4 wherein the improvement also comprises molding the container and appropriately treating the exterior surface to render same impervious to moisture.

6. The invention as defined in claim 5 wherein the improvement also comprises walls of the cylinder and cap formed of porous open cell urethane rigid foam toughened on the exterior walls thereof.

7. A container for storing an article comprising a tubular member defining a continuous wall and means defining caps sealing opposite ends of said tubular member, the improvement of said wall and caps consisting of a porous celled urethane foam having an impervious outer surface and a porous inner surface, said porous portion of said wall and said caps impregnated with a moisture laden mixture adapted for conditioning the article in said container and means incorporated in said tubular member defining score bands extending peripherally and axially of said tubular member to accommodate removal of said tubular member from said end caps.

References Cited

UNITED STATES PATENTS

| | | | |
|---|---|---|---|
| 1,467,969 | 9/1923 | Wood | 229—3.1 |
| 2,613,472 | 10/1952 | Ebert | 220—63 X |
| 2,695,847 | 11/1954 | Fisher. | |
| 2,914,377 | 11/1959 | Bull. | |
| 3,077,979 | 2/1963 | Jones et al. | 206—46 |
| 3,120,319 | 2/1964 | Buddrus | 215—13 |
| 3,163,908 | 1/1965 | Lawmaster. | |
| 3,189,243 | 6/1965 | Lux | 220—9 X |
| 3,276,666 | 10/1966 | Johnson | 229—51 |

FOREIGN PATENTS 722,518  1/1955  Great Britain.

MARTHA L. RICE, Primary Examiner

U.S. Cl. X.R.

249—134; 312—31.04; 264—261, 337; 229—3.5, 51